(12) United States Patent
Vidor

(10) Patent No.: US 8,956,070 B1
(45) Date of Patent: Feb. 17, 2015

(54) LEVER-OPERATED INTERNALLY PLACED SPRING-ACTION CLAMPING AND LOCKING DEVICE

(71) Applicant: Bela Vidor, Oakland, CA (US)

(72) Inventor: Bela Vidor, Oakland, CA (US)

( * ) Notice: Subject to any disclaimer, the term of this patent is extended or adjusted under 35 U.S.C. 154(b) by 0 days.

(21) Appl. No.: 13/937,603

(22) Filed: Feb. 2, 2014

(51) Int. Cl.
*F16B 2/00* (2006.01)
*F16B 7/04* (2006.01)

(52) U.S. Cl.
CPC .................................... *F16B 7/0446* (2013.01)
USPC ...................... 403/374.5; 403/322.4; 403/400

(58) Field of Classification Search
CPC ........ B27B 27/04; B27B 27/08; B27B 27/10; F16B 2/14; F16B 2/16; F16B 2/18; F16B 7/0446; F16B 7/0453; F16B 7/187; B23Q 3/005; E04B 2001/5881
USPC ............. 403/322.4, 374.1, 374.2, 374.5, 387, 403/400, 409.1; 83/446, 477.2
See application file for complete search history.

(56) References Cited

U.S. PATENT DOCUMENTS

| | | | |
|---|---|---|---|
| 4,641,983 A | | 2/1987 | Strassle |
| 4,848,203 A | * | 7/1989 | Brooks ........................... 83/438 |
| 5,730,343 A | * | 3/1998 | Settelmayer ................... 224/321 |
| 5,971,334 A | | 10/1999 | Crawshaw et al. |
| 6,360,642 B1 | * | 3/2002 | Miller et al. .................. 83/468.7 |
| 6,406,051 B1 | * | 6/2002 | Phillips ........................... 280/506 |
| 6,484,614 B1 | * | 11/2002 | Huang ............................. 83/438 |
| 7,413,368 B2 | * | 8/2008 | Naslund et al. ............... 403/321 |
| 8,814,461 B2 | * | 8/2014 | Vine ........................... 403/322.1 |
| 2011/0303064 A1 | * | 12/2011 | Wang ............................... 83/440 |
| 2012/0055307 A1 | * | 3/2012 | Burke et al. .................... 83/446 |

OTHER PUBLICATIONS

Training Center, T-Slotted Fasterning Introduction, found at http://www.8020.net/Training-2.asp, Feb. 28, 2005.
T-slot Fasteners Introduction, found at: http://www.tslotparts.com/fasteners-intro.asp, Apr. 28, 2006.

* cited by examiner

*Primary Examiner* — Joshua Kennedy
(74) *Attorney, Agent, or Firm* — Sharon Adams

(57) ABSTRACT

The invention comprises systems and devices for securely clamping and easily unclamping a first t-slot profile to a second t-slot profile. The clamping devices may move along a first t-slot profile, allowing the invention to clamp at different places along the first profile. The clamping systems and devices may be used for positioning a side-fence, connected with the second profile, relative to a saw blade, or for construction of a trade show booths, display assemblies, or other structures that may be securely clamped together, and easily unclamped.

14 Claims, 6 Drawing Sheets

LEVER-OPERATED INTERNALLY PLACED SPRING-ACTION CLAMPING AND LOCKING DEVICE

CROSS REFERENCE TO RELATED APPLICATION

Not applicable.

STATEMENT REGARDING FEDERALLY SPONSORED RESEARCH

Not applicable.

NAMES OF THE PARTIES TO A JOINT RESEARCH AGREEMENT

Not applicable.

BACKGROUND OF THE INVENTION

1. Field of the Invention

The invention relates to systems and devices for securely clamping, unclamping, or moveably clamping metal profiles. Embodiments include securely and removably clamping together metal profiles to build structures that may be used for any variety of reasons. In one embodiment, the invention may be used to accurately measure the distance from a saw blade by moveably clamping and unclamping profiles, where one profile is connected with a side fence at a specific distance from the saw blade as needed to cut a specific size of plastic, metal, wood, or other material. Additional embodiments may be used to moveably clamp one metal profile to another, to support cutting blades, turning devices, or any similar devices.

2. Description of the Related Art

There are many situations where t-slotted profiles made of aluminum, steel or other materials are used to build structures, including trade show booths, machine bases, tool racks, fixtures, workbenches, assembly stations, display structures, storage structures and more. Many existing clamping devices are designed to permanently secure one profile to the next.

A non-limiting exemplar description of related art involves side fences used to cut material while using a power saw. A common practice involves holding the sheet of material with one hand while operating the on/off switch of the cutting blade with the other hand. This practice requires absolute concentration on the part of the saw operator, and physical strength to hold the material in place. If the operator loses hold of the sheet of material, a sharp piece of jagged material may fly out at high velocity, endangering the operator or others in the area.

In addition, while the cutting blade is running, vibration may cause the sheet of material to creep out of position, resulting in pieces that may be inaccurate in size, out of alignment, or improperly shaped. It may be necessary to cut sheets of plastic, metal or other material into identical sizes and shapes, as a non-limiting background example, picture framers often need multiple pieces of clear plastic in the same shape, square, rectangular, circular, triangular, or any other shape.

In other embodiments, there may be situations where metal profiles are used to build structures. These structures may be held together with any variety existing fasteners. These include end fasteners, anchor fasteners, double anchor fasteners, dynamic hinges, structural hinges and other types of connectors. However, these do not allow for easy unclamping, or for moveable clamping one profile to another.

BRIEF SUMMARY OF THE INVENTION

Embodiments of invention are directed to systems and devices for securely and easily clamping t-slotted metal profiles to each other, and for moveably clamping t-slotted metal profiles to each other. The clamping devices allow for secure clamping and easy unclamping. The clamping device may move along a slot in a first t-slot profile, allowing the device to clamp at different places along the first t-slot profile.

The clamping device is comprised of a foot 11 connected by a linking rod 10 to assembly 15. Assembly 15 connects with a second t-slot profile 22, wherein the second t-slot profile 22 has cavity 220. Assembly 15 is sized to snugly fit within cavity 220.

Elevator 9 is connected via linking rod 15 to foot 11. Upon manipulating handle 1, elevator 9 and connecting rod 10 and foot 11 lift, resulting in foot 11 compressing against the t-slot, and locking the device in place.

In some embodiments, second t-slot 22 may function as a side fence for use with a power saw. In these embodiments, a first profile 21 may run perpendicular to the saw blade and may optionally have markings which may be used to measure the distance from the saw blade. The clamping device may be used to moveably clamp and unclamp second profile 22 connected with a side-fence to the first profile 21. In some embodiments, the side-fence may be adjustable, to create cuts of different angles, or the side-fence may be made of a specific material or strength.

Other embodiments of the invention allow for moveable and securely clamping and unclamping a first t-slot profile 21 to a second t-slot profile 22. This has numerous applications and embodiments, including rapid construction of trade show booths, display assemblies, and other structures that need to be securely clamped together, and easily unclamped.

DESCRIPTION OF THE SEVERAL VIEWS

DETAILED DESCRIPTION

The invention comprises systems and devices for securely clamping and easily unclamping t-slot profiles. The clamping devices may move along a first t-slot profile 21, allowing the invention to clamp at different places along the profile.

Figure 1:
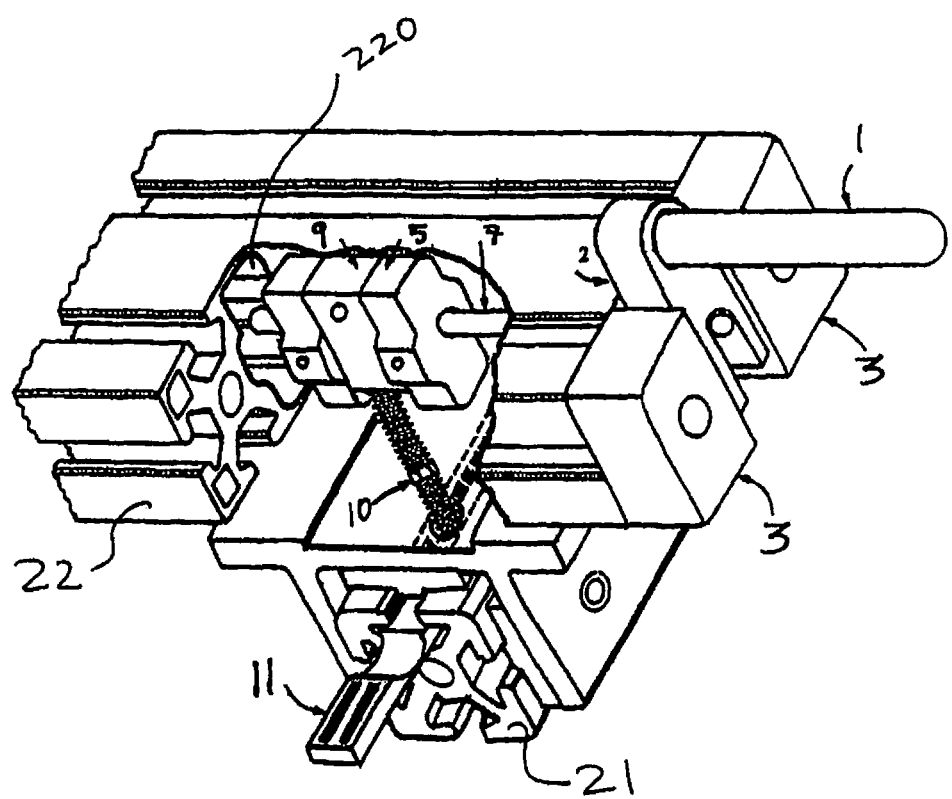
FIG. 1 is a perspective view of an embodiment of the invention, clamping two profiles together, with a cut-away view showing the assembly.
Figures 2A, 2B:
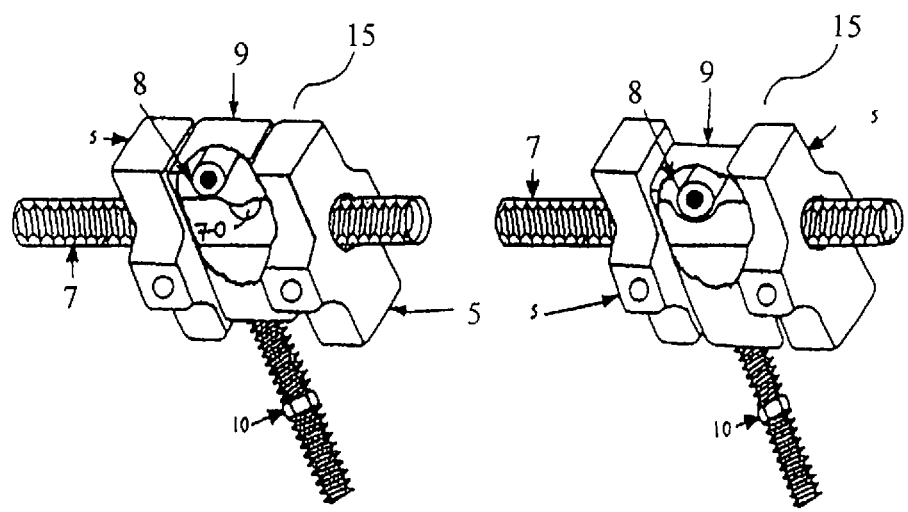
FIG. 2A is a perspective side view of an embodiment of the assembly, showing in cut-away view one position of the elevator and cam rod inside the assembly.
FIG. 2B is a perspective side view of an embodiment of the assembly, showing in cut-away view a second position of the elevator and cam rod inside the assembly.

The clamping device is comprised of locking foot 11, connected with linking rod 10, which is connected with elevator 9 within clamping assembly 15, as shown in FIGS. 1 and 2A. Linking rod 10 and locking foot 11 are sized to moveably fit within a slot of first profile 21, and may move along the entire length of the slot in the first profile 21.

Figures 4A, 4B:
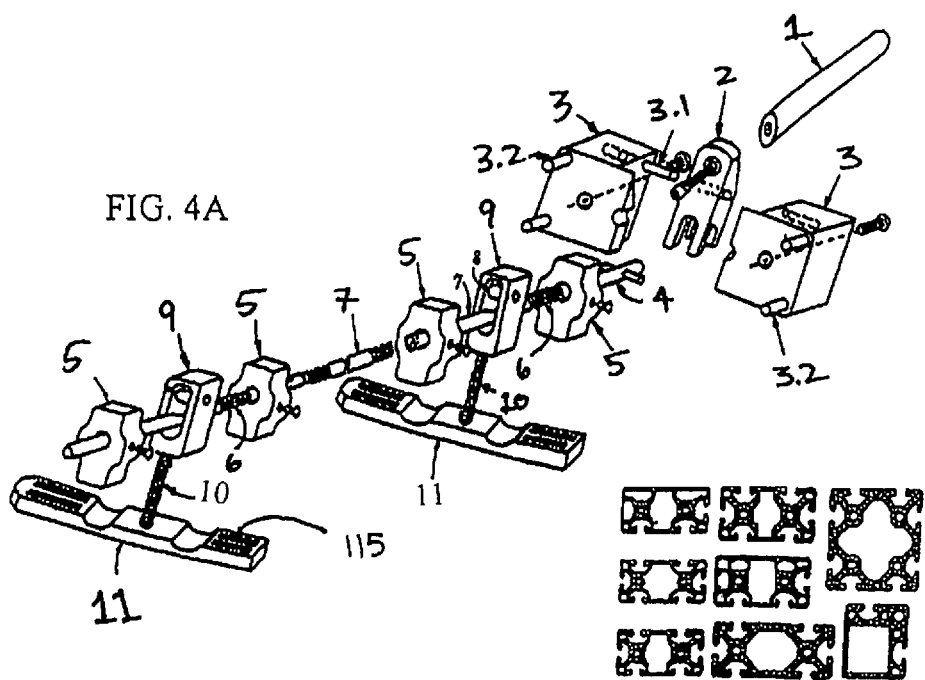
FIG. 4A is an exploded view of another embodiment of the invention.
FIG. 4B shows, as non-limiting examples, some t-slotted profiles with inside surfaces.

Locking foot 11 fits snugly within a slot of the first profile 21, as shown in FIG. 1. FIG. 4B shows exemplar first profiles 21, with various t-slot shapes and sizes. The locking foot 11 may be made of any size or shape, as needed to snugly, and moveable fit with the required slot and to travel along the slot.

Figures 5A, 5B, 5C:
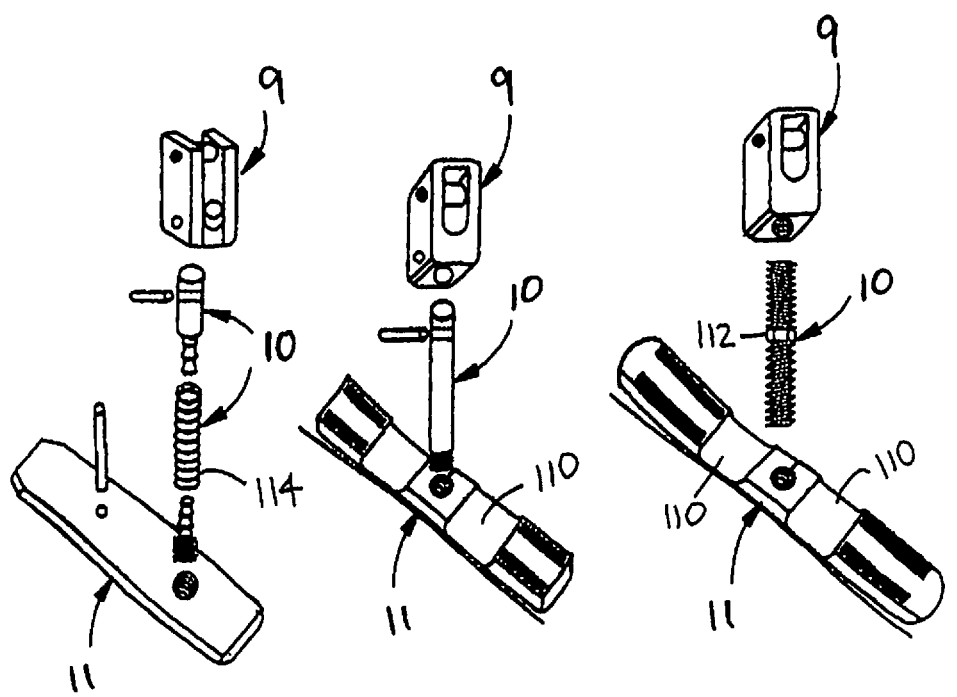
FIG. 5A is a perspective side view of one embodiment of the linking rod, lifting foot and other components of the invention.
FIG. 5B is a perspective side view of one embodiment of the linking rod, lifting foot and other components of the invention.
FIG. 5C is a perspective side view of one embodiment of the linking rod, lifting foot and other components of the invention.
Figure 6A:
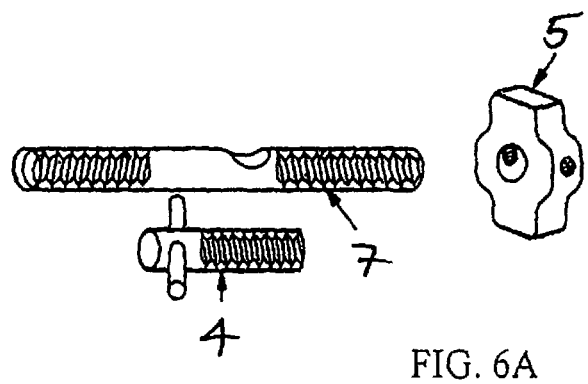
FIG. 6A shows one embodiment of components of the invention, with a circular push-pull elevating cam-rod and front stem.
Figure 6B:
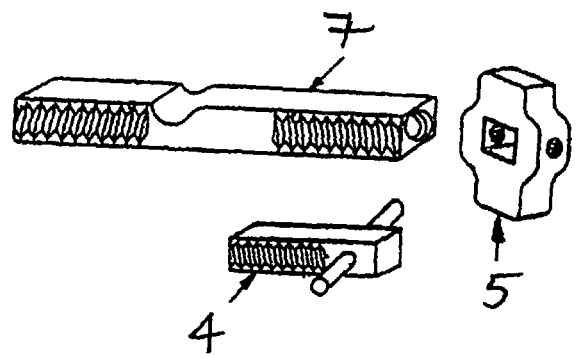
FIG. 6B shows another embodiment of components of the invention with a rectangular or square push-pull elevating cam-rod and front stem.

The locking foot may also have differing levels of stiffness or spring. In some embodiments, locking foot 11 may have cutouts 110. The size and depth of cutouts 110 affect the stiffness or springiness of the locking foot. There may be instances where little or no spring is needed, and for these situations, locking foot 11 may have no cutouts at all, as shown in FIG. 5A. In other embodiments, locking foot 11 may have non-slip pads 115. In other embodiments, locking foot 11 may be of different lengths, as shown in FIGS. 5A, 5B and 5C.

In some embodiments linking rod 10 is a threaded linking rod, with a screw 112 that allows for precise adjustment of the height of linking rod 10. In other embodiments, linking rod 10 may be solid, or may have multiple parts including a spring 114, as shown in FIGS. 5A, 5B and 5C.

Assembly 15 is comprised of elevator 9, tightly sandwiched between guides 5. Linking rod 10 is connected with elevator 9. Elevator 9 may move up and down relative to guides 5, but will not move forward or backward, as shown in FIGS. 2A and 28. Assembly 15 is sized, as needed, to snugly fit within cavity 220.

Push-pull elevating cam-rod 7 runs through guides 5 and elevator 9. Rod 7 contains pocket 70, and pocket 70 is positioned to be within elevator 9, as shown in FIGS. 2A and 2B.

Elevator 9 is connected with rolling bushing 8. In some embodiments, rolling bushing 8 may be a separate piece, and in other embodiments rolling bushing 8 and elevator 9 may be a single unit. Rolling bushing 8 and pocket 70 are positioned so that when the device is unclamped, bushing 8 rests within pocket 70. When the operator manipulates handle 1, rod 7 moves forward (or backward) relative to bushing 8, and bushing 8 rises out of pocket 70. As bushing 8 moves out of pocket 70, elevator 9 rises up, as shown in FIGS. 2A and 2B. When elevator 9 lifts up, locking foot 11 is also lifted via linking rod 10, thereby compressing the locking foot 11 against the inside of the t-slot in the first profile 21.

In some embodiments, pocket 70 is on the top of rod 7, while in other embodiments, pocket 70 may be on the bottom on rod 7, or in any of position on rod 70 that is within elevator 9.

Figure 3:
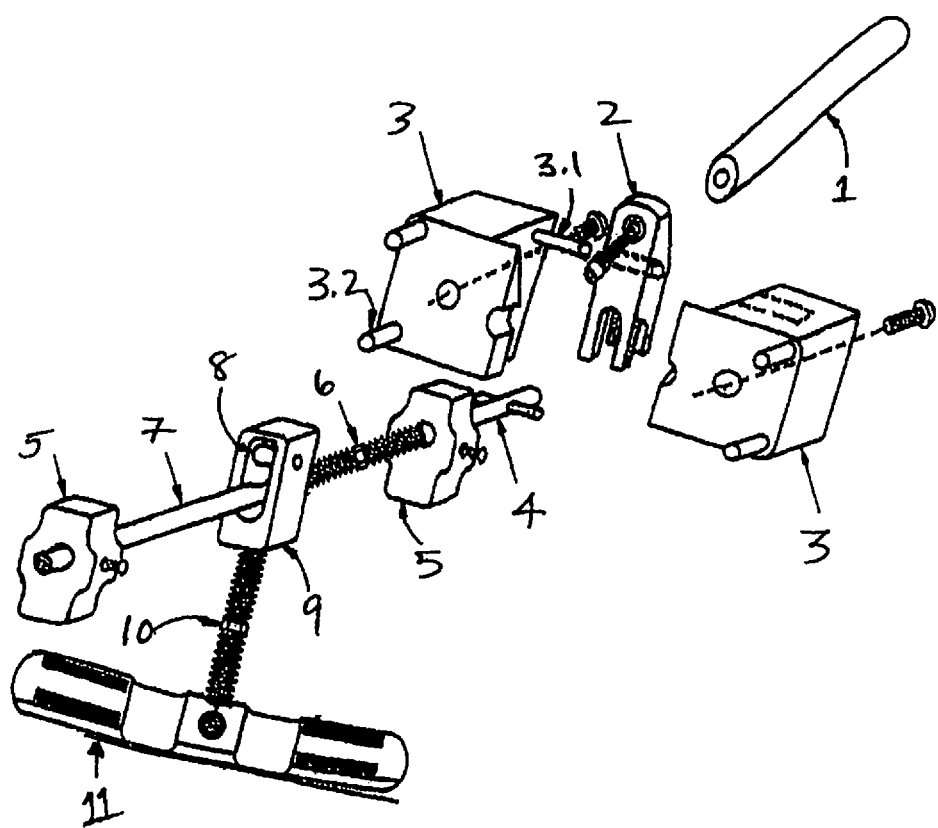
FIG. 3 is an exploded view of an embodiment of the invention.

Rod 7 moves forward or backward in response to operator manipulation of handle 1. In some embodiments, handle 1 is connected with fulcrum fork 2, as shown in FIG. 3. Manipulating handle 1 causes fulcrum fork 2 to pivot on fulcrum pin 3.1. Upon pivoting, fork 2 engages push/pull pin 3.1 and moves pin 3.1 forward (or backward). In some embodiments, pin 3.1 is connected with rod 7, so than when the operator manipulates handle 1, fork 2 pushes pin 3.1, resulting in rod 7 moving backward relative to elevator 9 and bushing 8. Bushing 8 will move out of pocket 70, causing elevator 9 to rise up, lifting locking foot 11 up and pressing it against the t-slot of the first profile 21. The clamping device is thereby securely locked in place.

To unlock the device, the operator manipulates handle 1, moving rod 7 until bushing 8 rests in pocket 70. This allows elevator 9 to descend, thereby causing locking foot 11 to move away from the inside of the first profile t-slot 21. In the unlocked position, elevator rolling bushing 8 rests within pocket 70 of push-pull elevating cam-rod 7.

In some embodiments, pin 3.1 is connected with front stem 4 which in turn pushes the threaded linking rod 6 that is in turn connected with rod 7, which moves relative to bushing 8. In some embodiments front stem 4 is an internally threaded stem.

In some embodiments, fulcrum pin 3.1 is held in position by fulcrum support 3, as shown in FIG. 3. Fulcrum support 3 is comprised of fulcrum pin 3.1 and profile connection pin 3.2. In some embodiments, profile connection pin 3.2 may connect the clamping device to the second profile.

In some embodiments, the clamping device may be used to moveably position a side fence on a power saw, to guide the saw operator in cutting a desired size or shape of material. In these embodiments, a first t-slot profile 21 runs perpendicular to the direction of the saw blade cut, and may optionally be used to measure the distance from the saw blade. In some embodiments, a second t-slot profile 22 is perpendicular to the first profile 21, as shown in FIG. 1. In these embodiments, profile 22 is parallel to the saw blade, and may act as a side fence, or may be connected with a side fence. Second profile 22 may be of any length, as needed.

In these embodiments, the operator engages handle 1 to unlock the clamping device, and may move the device to the distance desired from the saw blade. The operator manipulates handle 1 to lock the clamping device, connected with profile 22 and side fence, at the desired location. Once clamped, the device will remain locked and thereby securing profile 22 and side fence at the desired distance while the operator turns on the saw blade and cuts the material to the specified size. After finishing the cut, the operator may engage handle 1 to unclamp the device, and reposition the clamping device and side fence, as necessary.

In other embodiments, second t-slot 22 may be connected with an adjustable side-fence, to create cuts of different angles. In these embodiments, the second profile 22 may adjust to create an angle, or second profile 22 may be connected with a device that adjusts to create angled saw cuts.

Second profile 22 may be connected with various types of side fences to create a stronger or weaker side fence, or an adjustable side fence, or to a side-fence made of a specific material or strength. For example, if cutting a plurality of sheets of plastic, metal, wood or other material, the side fence may be made of stronger material.

Other applications include using the invention as a safety load-bearing unit to keep outdoor high-rise portable maintenance elevators from suddenly falling to the ground.

In some embodiments, the clamping devices may be linked with multiple clamping assemblies in a row, as shown in FIG. 4A, using threaded extension rods 12, with adjustability. This clamping and locking device may be operated in a parallel relationship direction, or a 90 degree relationship direction. The clamping grip is adjustable to a load well above 50 pounds per square inch.

Other embodiments of the invention comprise using the clamping devices to clamp t-slot profiles to each other, to create easy-to-assemble structures, or structures that are securely clamped together and easily unclamped, as needed. The first profile 21 and the second profile 22 may be made of any shape or size, as needed to create a desired structure. Profiles 21 or 22 may be connected with additional pieces that perform functions, as needed. Non-limiting examples include connections to shelves for displaying items; connections to movable arms for displaying items; or connections to decorative treatment for a background in a display.

The invention may be embodied in other specific forms without departing from the spirit or essential characteristics thereof. The embodiments disclosed in this specification are to be considered in all respects as illustrative and not restrictive, and all changes that come within the meaning and range of equivalency of the claims are intended to be embraced therein.

A recitation of "a" "an" or "the" is intended to mean "one or more" unless specifically indicated to the contrary. The use of the words "lift" "rise" "descend" "up" "forward" or "backward" is intended to mean "lift or lower", "rise or descend", "up or down", "forward or backward" unless specifically indicated to the contrary.

What is claimed is:

1. A system for moveably clamping and easily unclamping two t-slot profiles comprising:
    a first t-slot profile and a second t-slot profile, wherein the first t-slot profile is comprised of metal forming at least one slot running the length of the first profile, and wherein the second t-slot profile is comprised of metal forming a cavity sized to snugly receive an assembly;
    said assembly comprising:
        an elevator and bushing tightly sandwiched between guides,
        a cam rod running through the elevator and guides and having a pocket that is positioned relative to the bushing within the elevator, and
        wherein the assembly is sized to securely fit within the cavity in the second profile;
        a linking rod connecting the elevator to a locking foot, wherein the locking foot is sized to moveably fit within at least one slot in the first t-slot profile, wherein the locking foot is capable of moveably sliding inside the slot of the first t-slot profile when said locking foot is unclamped, and thereby sliding the second t-slot profile along the length of the first profile;
        a handle connected with the cam rod, wherein manipulating the handle in a first direction will move the cam rod, and thereby move the pocket relative to the bushing, thus lifting the elevator, linking rod and locking foot, and compressing and clamping the locking foot to an inside surface of the at least one slot in the first t-slot profile, wherein the locking foot is capable of securely clamping at any distance along the length of the first t-slot profile.

2. The system of claim 1 wherein manipulating the handle in a second direction will move the cam rod, and thereby move the pocket relative to the elevator bushing, descending the elevator, linking rod and locking foot, de-compressing and unclamping the locking foot from the inside surface of the slot in the first t-slot profile.

3. The system of claim 1, wherein the elevator and bushing comprise a single unit.

4. The system of claim 1, wherein the linking rod is adjustable.

5. The system of claim 4, wherein the linking rod is adjusted with a screw.

6. The system of claim 1, wherein the locking foot has non-slip pads.

7. The system of claim 1, wherein the locking foot has at least one cut-out.

8. The system of claim 1, wherein manipulating the handle pivots a fulcrum pin on a fulcrum fork, moving the cam rod.

9. The system of claim 1, wherein the first profile is perpendicular to a power saw blade and the second profile is a side fence for the saw blade.

10. The system of claim 9, wherein the first profile has markings to measure distance from the saw blade, and an operator may move the second profile along the length of the first profile and clamp the second profile at a specific distance on the first profile.

11. The system of claim 9, wherein the side fence is connected with the second profile.

12. The system of claim 9, wherein the side fence is adjustable.

13. The device of claim 1, wherein a plurality of first and second t-slot profiles are clamped at specific distances to form a structure.

14. The device of claim 13, wherein the structure formed is selected from the group comprising: shelving structures, display structures, and storage structures.

* * * * *